(12) United States Patent
Saagge

(10) Patent No.: US 7,070,527 B1
(45) Date of Patent: Jul. 4, 2006

(54) VENTILATED CLUTCH ASSEMBLY WITH REDUCED-SLIP SHEAVE SURFACES

(75) Inventor: Darin Saagge, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 60 days.

(21) Appl. No.: 10/328,734

(22) Filed: Dec. 23, 2002

(51) Int. Cl.
*F16H 57/04* (2006.01)

(52) U.S. Cl. ......................................................... 474/93
(58) Field of Classification Search ................ 474/8, 474/17, 18, 28, 93
See application file for complete search history.

(56) References Cited

U.S. PATENT DOCUMENTS

| | | | |
|---|---|---|---|
| 1,372,700 A | 3/1921 | Kimble | |
| 1,385,396 A | 7/1921 | Rayburn | |
| 1,388,865 A | 8/1921 | Kimble | |
| 1,443,541 A | 1/1923 | Kimble | |
| 2,953,032 A | 9/1960 | Ruess ........................ 74/230.6 |
| 3,618,412 A * | 11/1971 | Schmid ......................... 474/8 |
| 3,861,229 A | 1/1975 | Domaas ............... 74/230.17 E |
| 3,943,785 A | 3/1976 | Percifield ................. 74/242.12 |
| 3,965,766 A | 6/1976 | Luenberger .......... 74/230.17 A |
| 4,395,249 A | 7/1983 | Prasad et al. .................. 474/93 |
| 4,493,677 A | 1/1985 | Ikenoya ....................... 474/93 |
| 4,504,022 A * | 3/1985 | Stang et al. ............. 242/366.1 |
| 4,509,933 A | 4/1985 | Miranti, Jr. et al. ........... 474/93 |
| 4,530,680 A | 7/1985 | Miranti, Jr. ................... 474/93 |
| 4,531,928 A | 7/1985 | Ikenoya ....................... 474/93 |
| 4,555,239 A | 11/1985 | Miranti, Jr. ................... 474/93 |
| 4,629,444 A | 12/1986 | Miranti, Jr. ................... 474/93 |
| 4,631,977 A | 12/1986 | Kawashima ............... 74/606 A |
| 4,671,782 A | 6/1987 | Ochiai et al. ................. 474/93 |
| 4,697,665 A | 10/1987 | Eastman et al. ............ 180/230 |
| 4,712,629 A | 12/1987 | Takahashi et al. ......... 180/68.1 |
| 4,905,461 A * | 3/1990 | Heuer ........................ 56/12.8 |
| 5,967,286 A | 10/1999 | Hokanson et al. ...... 192/110 R |
| 5,976,044 A | 11/1999 | Kuyama ....................... 474/93 |
| 6,176,796 B1 * | 1/2001 | Lislegard ...................... 474/93 |
| 6,267,700 B1 | 7/2001 | Takayama .................... 474/93 |
| 6,938,508 B1 * | 9/2005 | Saagge .................. 192/113.23 |

FOREIGN PATENT DOCUMENTS

JP           10252849           9/1998

* cited by examiner

*Primary Examiner*—Vicky A. Johnson
(74) *Attorney, Agent, or Firm*—Baker & Daniels LLP

(57) ABSTRACT

The invention provides an apparatus and method for cooling a V-belt in a clutch assembly of a CVT. As previously mentioned, the CVT is comprised of a drive clutch assembly, a driven clutch assembly, and an endless V-belt disposed about the drive and driven clutch assemblies. The invention will cool the V-belt as it rides about the drive clutch and driven clutch assemblies. In addition, the invention provides a method for providing a reduced-slip sheave surface for the V-belt in a clutch assembly of a CVT. Normally, as the V-belt rides about the drive and driven clutch assemblies, the V-belt contacts inner surfaces of the clutch assemblies. The invention will reduce belt slippage across the inner surfaces of the clutch assemblies.

25 Claims, 7 Drawing Sheets

VENTILATED CLUTCH ASSEMBLY WITH REDUCED-SLIP SHEAVE SURFACES

TECHNICAL FIELD

The invention relates to continuously variable transmissions, such as those used in snowmobiles, and, in particular, to the drive and driven clutch assemblies that function thereon.

BACKGROUND OF THE INVENTION

Split sheave continuously variable transmissions (CVTs) are used in a variety of recreational type off-road vehicles such as snowmobiles, all-terrain vehicles (ATVs), golf carts, and the like. CVTs, as their name implies, do not require shifting through a series of forward gears, but rather provide a continuously variable gear ratio that automatically adjusts as the vehicle speeds up or slows down, thus providing relatively easy operation for a rider. This automatic adjustment mechanism is advantageous to the rider because he needs not be bothered by shifting gears for increasing or decreasing vehicle speed. However, this mechanism is also disadvantageous because, by its very function, the mechanism produces external stress to a V-belt that is utilized within the CVT. This external stress eventually causes the V-belt to break down, with the V-belt being torn apart or shredded.

Typically, CVTs are comprised of a drive clutch assembly, a driven clutch assembly, and the V-belt disposed about the clutch assemblies. The driven clutch assembly includes a pair of opposed sheaves, which together define a generally V-shaped "pulley" within which the V-belt rides. The drive clutch assembly is similarly configured with a pair of opposed sheaves.

As previously mentioned, while the operation of the CVT allows the rider to not be concerned with shifting gears, it also promotes external stress to the V-belt, eventually resulting in the V-belt breaking down and having to be replaced. While this is a well-known occurrence, it is also a general inconvenience for the rider, since he subsequently has to spend time and money buying and replacing the belt. If a CVT could be configured to somehow increase the operational lifetime of the V-belt running therein, it would be a very valuable marketing tool for manufacturers of vehicles that utilize CVTs.

SUMMARY OF THE INVENTION

The invention provides an apparatus and method for cooling a V-belt in a clutch assembly of a CVT. As previously mentioned, the CVT is comprised of a drive clutch assembly, a driven clutch assembly, and an endless V-belt disposed about the drive and driven clutch assemblies. The invention will cool the V-belt as it rides about the drive clutch and driven clutch assemblies. In addition, the invention provides a method for providing a reduced-slip sheave surface for the V-belt in a clutch assembly of a CVT. Normally, as the V-belt rides about the drive and driven clutch assemblies, the V-belt contacts inner surfaces of the clutch assemblies. The invention will reduce belt slippage across the inner surfaces of the clutch assemblies.

The apparatus of the invention includes a clutch assembly, which is comprised of an axially stationary sheave, an axially movable sheave, a plurality of ribs, and at least one bore. Each of the axially stationary and axially movable sheaves have a sheave body with an inner face and an outer face. The inner faces of the sheaves are oppositely disposed from each other, such that a pulley is formed between the sheaves. The plurality of ribs protrude from the outer face of at least one of the axially stationary or the axially movable sheaves. The plurality of ribs are spatially distributed over the outer face of the at least one of the sheaves, with the at least one bore abutting a side of one or more ribs of the plurality of ribs and positioned to lead the one or more ribs in the rotating direction of the at least one of the sheaves.

One method of the invention involves providing for radially- and laterally directed airflow to a V-belt utilized in a continuously variable transmission. The method comprises a step of providing a continuously variable transmission. A clutch assembly is then removed from the continuously variable transmission and a first sheave is removed from the clutch assembly. A second sheave is provided, the second sheave being comprised of an inner face and an outer face. The outer face has a plurality of spatially distributed ribs, in which one or more ribs has at least one bore positioned to lead the at least one or more ribs in the rotating direction of the second sheave. The first sheave is replaced with the second sheave on the driven clutch assembly and the clutch assembly is replaced in the continuously variable transmission.

Another method of the invention involves providing a clutch assembly having a reduced-slip sheave surface. The method comprises a step of providing a continuously variable transmission. A clutch assembly is removed from the continuously variable transmission and a first sheave is removed from the clutch assembly. A second sheave is provided, the second sheave being comprised of an inner face and an outer face. The outer face has at least one bore. The first sheave is replaced with the second sheave on the driven clutch assembly and the clutch assembly is replaced on the clutch assembly in the continuously variable transmission.

DETAILED DESCRIPTION OF THE INVENTION

Figure 1:
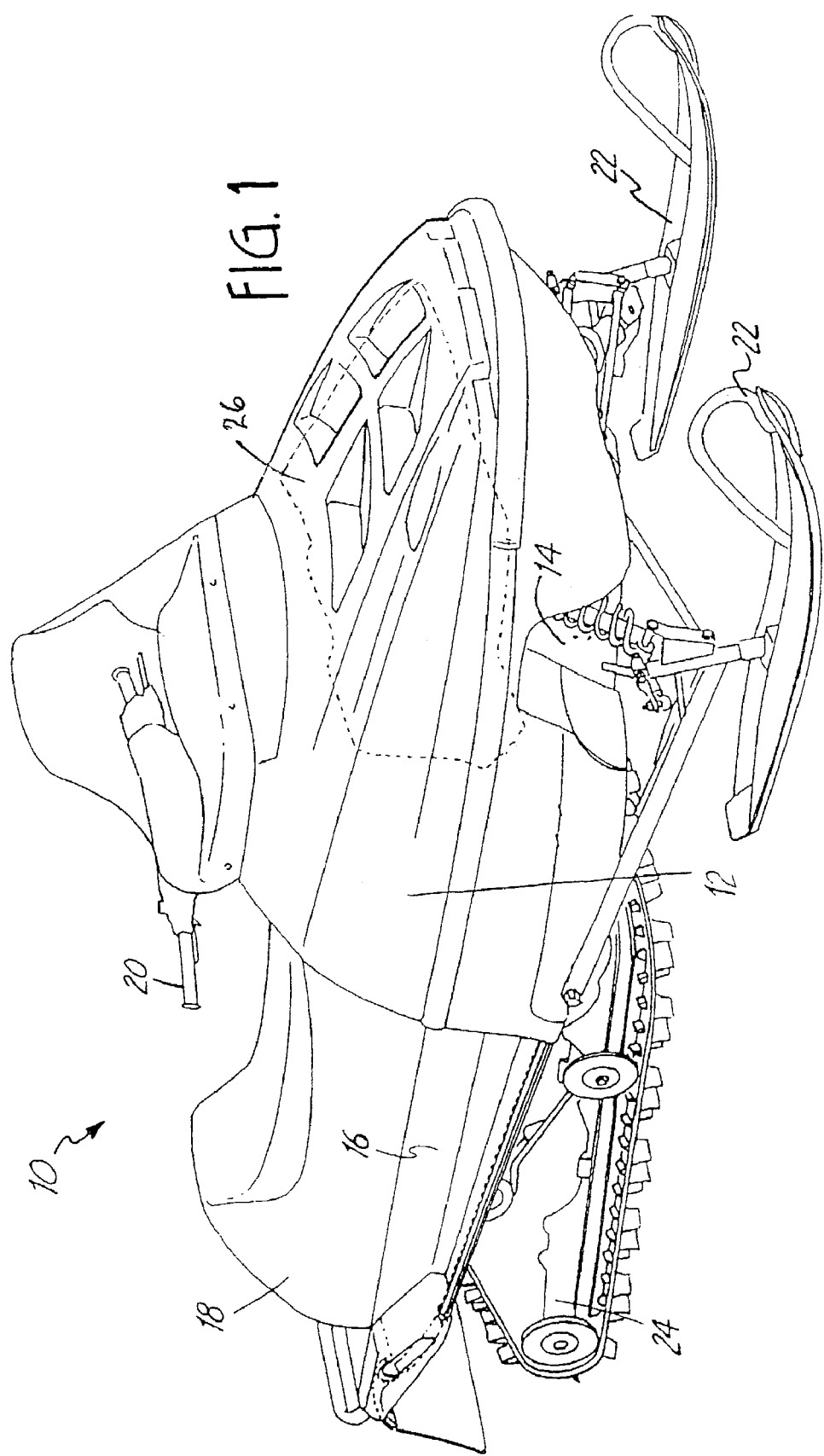
FIG. 1 is a perspective view of a snowmobile constricted in accordance with one embodiment of the invention.

The following detailed description is to be read with reference to the drawings, in which like elements in different figures have like reference numerals. The drawings, which are not necessarily to scale, depict selected embodiments, but are not intended to limit the scope of the invention. It will be understood that many of the specific details of the vehicle incorporating the system illustrated in the drawings could be changed or modified by one of ordinary skill in the art without departing significantly from the spirit of the invention. The function and operation of continuously variable transmissions (CVTs) are well known (see e.g., U.S.

Pat. No. 3,861,229, Domaas, the teachings of which are incorporated herein by reference) and need not be described in detail. The CVT of the invention is designed for use on vehicles such as snowmobiles and ATVs, however it may be used on such other vehicles as golf carts and the like.

A snowmobile 10 having a system in accordance with one embodiment of the invention is illustrated in FIG. 1. The snowmobile 10 includes a body assembly 12 made up of a number of parts which may be formed of suitable materials that cover and protect a support frame or chassis 14. The body assembly 12 further includes a rear body portion 16 that accommodates a seat 18 adapted to carry one or more riders in straddle fashion. A handlebar assembly 20, positioned forwardly of the seat, is conventionally connected to a pair of front skis 22 for steering the snowmobile. The skis 22 are supported by a suitable front suspension system that is connected to the chassis 14. Rearwardly of the front skis 22 and beneath the seat 18, the chassis 14 suspends an endless track assembly 24 by a suitable suspension. The endless track 24 is driven by an internal combustion engine indicated generally by reference numeral 26 that is supported by the chassis 14 and located in an engine compartment within the body assembly 12 towards the front of the snowmobile 10. Positioned proximate to the engine, supported by the chassis 14, and located within the body assembly 12 is also a CVT (not shown).

Figure 2:
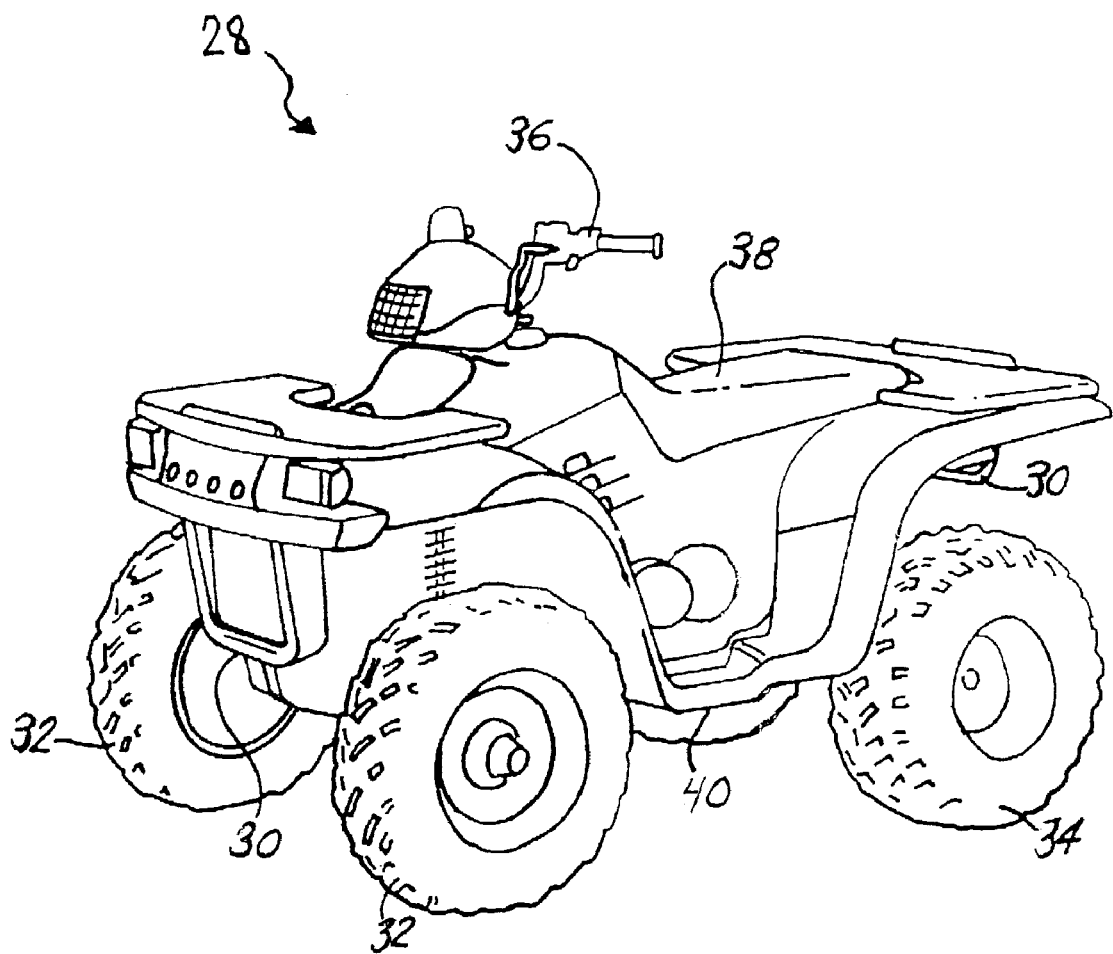
FIG. 2 is a perspective view of an ATV constructed in accordance with one embodiment of the invention.

An ATV 28 having a system in accordance with one embodiment of the invention is illustrated in FIG. 2. The ATV includes a chassis, designated generally by reference numeral 30, to which the various systems and components of the vehicle are attached. These components include front wheels 32, rear wheels 34, handlebars 36 connected by a suitable steering linkage to the front wheels 32 for steering the vehicle, and a straddle-type seat 38 upon which the rider sits. An engine and a CVT are carried on the chassis 30, generally beneath the straddle-type seat 38 and substantially between a pair footrests (only the left footrest 40 is visible in FIG. 2).

Figure 3:
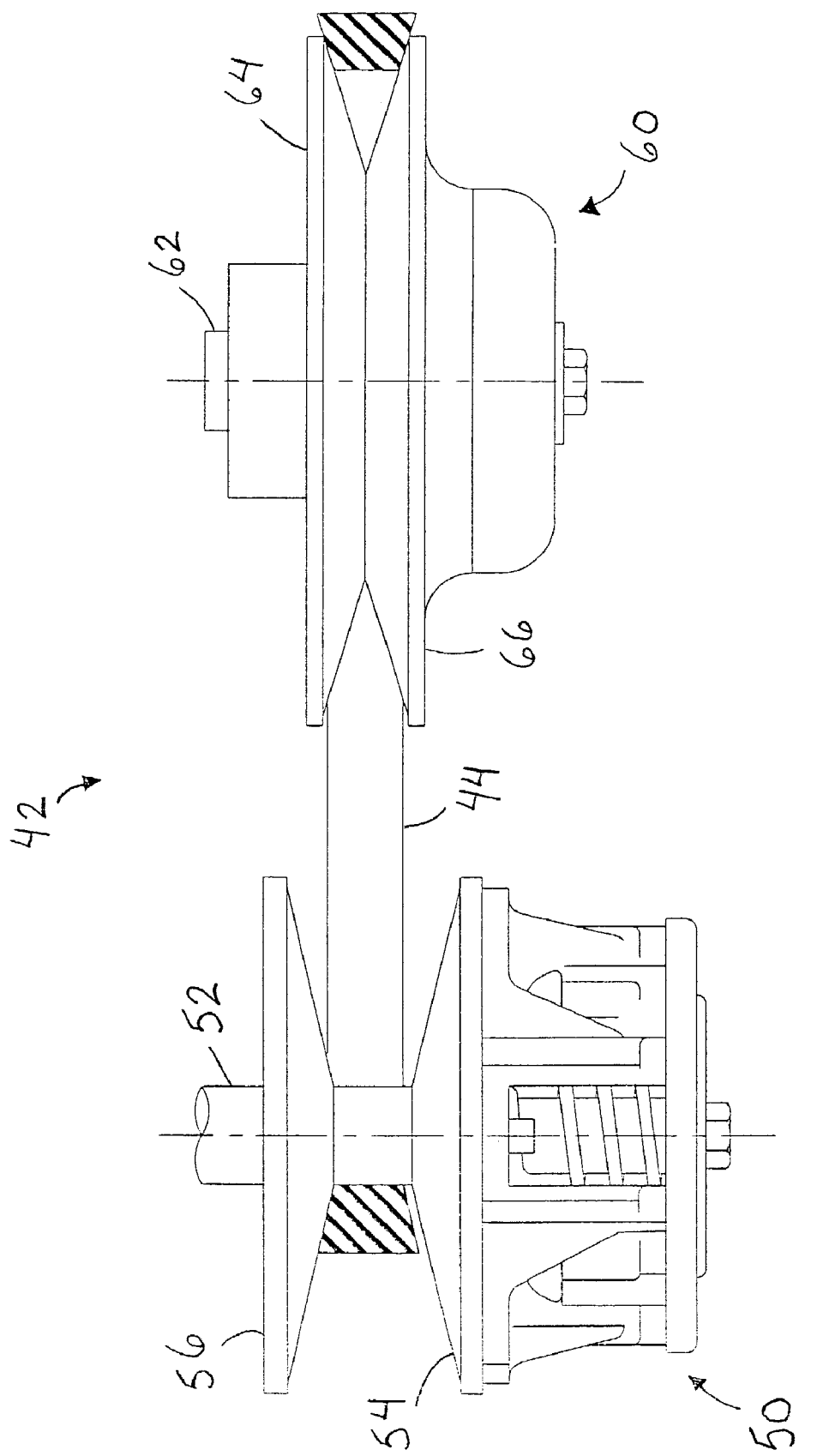
FIG. 3 is a top view of a continuous variable transmission.

FIG. 3 illustrates the features of a CVT suitable for use with a vehicle such as those described above. The CVT 42 includes a drive clutch assembly 50 having a drive shaft 52, a driven clutch assembly 60 having a driven shaft 62, and an endless V-belt 44 disposed about the drive and driven clutch assemblies 50 and 60 respectively. As indicated previously, the driven clutch assembly 60 includes a pair of opposed sheaves which together define a generally V-shaped "pulley" within which the V-belt 44 rides. One of the sheaves 64 is axially movable (i.e., movable in the direction parallel to the axis of the driven shaft 62), and the other sheave 66 is axially stationary. The drive clutch assembly 50 is similarly configured from a pair of opposed sheaves, one being axially movable 54 and the other being axially stationary 56.

Figure 4:
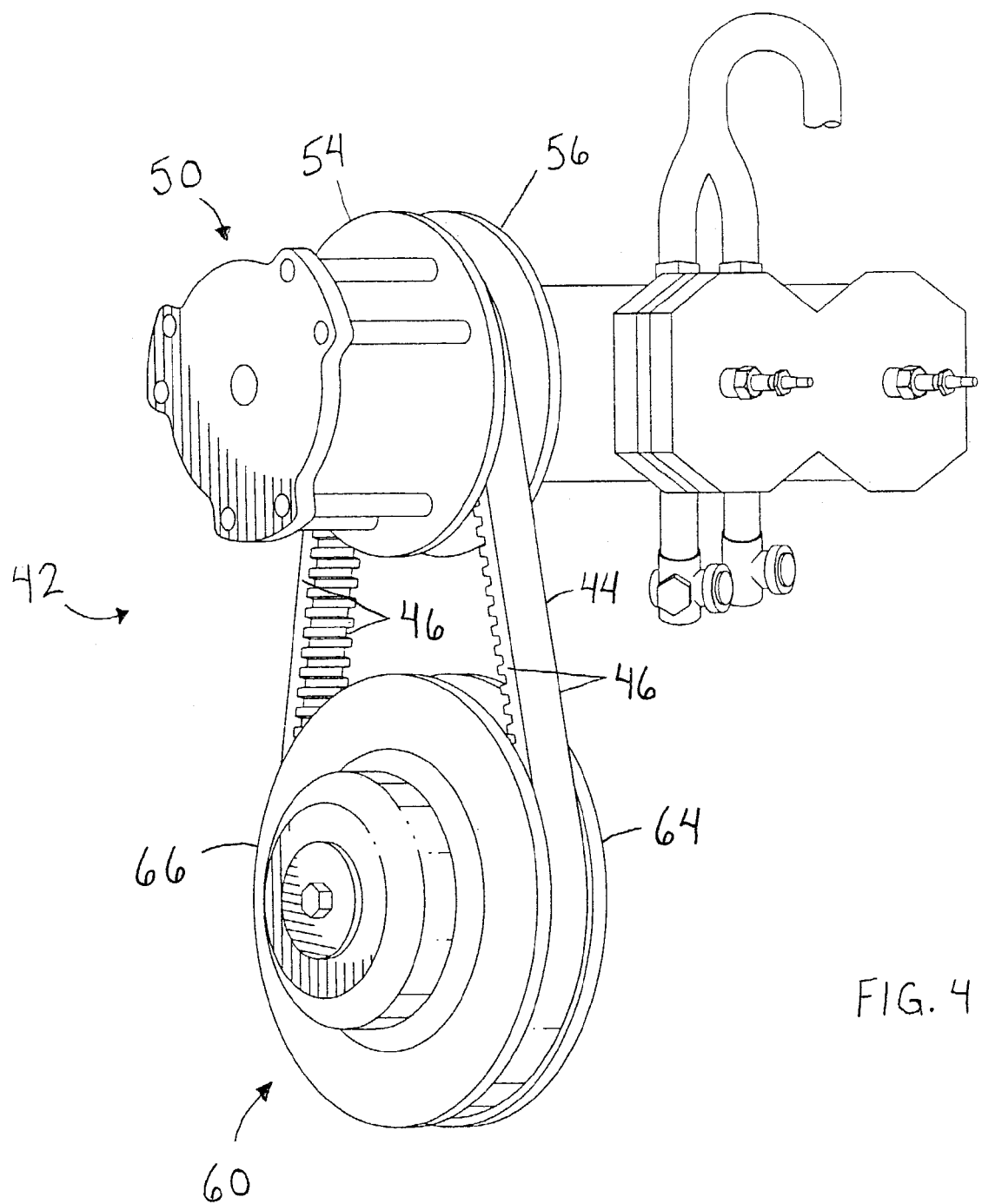
FIG. 4 is a perspective view of the continuous variable transmission of FIG. 3.

FIG. 4 is a perspective view of the CVT 42 of FIG. 1. The functioning of the CVT 42, in regards to the movement of the V-belt 44 about the drive clutch assembly 50 and the driven clutch assembly 60, is illustrated. The sheaves 54 and 56 of the drive clutch assembly 50 are normally biased (such as by a spring) axially away from each other, and the sheaves 64 and 66 of the driven clutch 60 are normally biased axially toward each other (typically by a spring). When the vehicle is not in motion and the engine is not engaged, the CVT 42 rotates at idle speed, and the V-belt 44 is positioned as shown, oriented high in the V-shaped "pulley" of the driven clutch assembly 60 and low in the V-shaped "pulley" of the drive clutch assembly 50. When the engine is engaged, and the vehicle accelerates in speed, the V-belt 44, in turn, is rotated about the drive clutch assembly 50 and the driven clutch assembly 60 at an accelerated rate. In turn, a centrifugal mechanism in the drive clutch 50 causes the axially movable sheave 54 to move toward the axially stationary sheave 56, squeezing the V-belt 44 radially outwardly. The V-belt 44 is pulled radially inwardly on the driven clutch 60, causing the axially movable sheave 64 of the driven clutch 60 to move axially away from the axially stationary sheave 66. The accelerated rotation of the V-belt 44, coupled with compressive forces exerted on the V-belt 44 sides by the axially movable sheave 64 and the axially stationary sheave 66 of the driven clutch assembly 60, cause a build-up of excessive heat on the V-belt 44. In particular, the build-up of heat is quite high at surfaces 46 where the V-belt 44 contacts with the axially movable sheave 64 and axially stationary sheave 66.

As previously mentioned, the material breakdown of the V-belt 44 is the net result of many factors, however, almost all of the factors tend to be derived from the V-belt 44 getting too hot, and essentially fatiguing to the point of breakdown. Therefore, in designing a CVT to increase the operational lifetime of the V-belt 44 that rides therein, it is contemplated by the inventors that it would be best to create cooling in the driven clutch assembly 60, in areas in contact with the V-belt 44 and in areas proximate to the V-belt 44. This cooling is done specifically by modifying the axially movable sheave 64 and axially stationary sheave 66 accordingly. However, it is also contemplated that these modifications could very well be applied in the case of the drive clutch assembly 50 and its corresponding sheaves 54 and 56. The exemplary embodiments that will be largely discussed will involve the driven clutch assembly 60. However, it is to be understood that the scope of the present invention is not limited to these exemplary embodiments.

Figure 5:
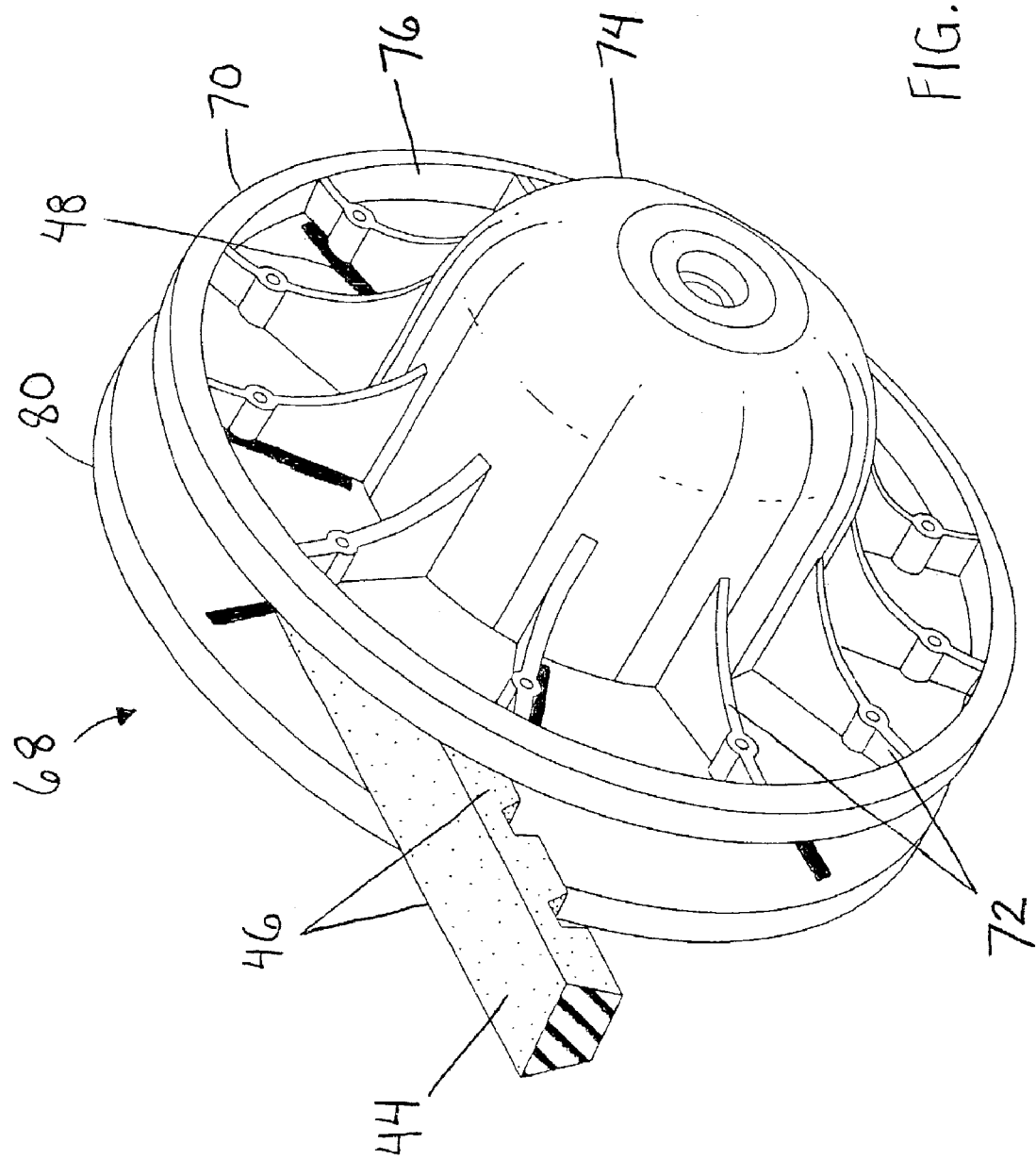
FIG. 5 is a perspective view of a driven clutch assembly illustrating an embodiment of the invention.

FIG. 5 is a perspective view of an exemplary embodiment of a driven clutch assembly 68 of the invention taken from a vehicle that utilizes a CVT. The driven clutch assembly 68 is comprised of an axially stationary sheave 70 and an axially movable sheave 80. The V-belt 44 travels within a V-shaped "pulley" between the sheaves 70 and 80 when the driven clutch assembly 68 is utilized with a drive clutch assembly in the CVT, as illustrated in FIG. 2. A plurality of ribs 72 protrude from the outer face of the axially stationary sheave 70. As shown, each rib 72 comprises a thin, straight-walled member that has a length dimension that exceeds its width dimension and extends from the central hub 74 to the outer edge 76 of the axially stationary sheave 70. As also shown, each rib 72 is a molded portion of the axially stationary sheave 70, with the lower surface of each rib 72 being integrally joined with the outer face of the sheave 70, and the upper surface of each rib 72 being exposed and ranging in height from a maximum at the end attached to the central hub 74 and generally decreasing in height as the rib 72 extends to the outer edge 76 of the sheave 70. As shown, the plurality of ribs 72 are spatially positioned around the sheave surface in a windmill-like pattern, wherein each rib 72 is generally separated from adjacently-lying ribs 72 by a substantially equal sheave surface area.

Abutting every other rib 72 is at least one bore 48 (all of which cannot be observed because of the height of the ribs 72). As shown, each bore 48 is defined by the axially stationary sheave 70 and comprised of a slot that extends through the axially stationary sheave 70. The bores 48 are positioned adjacent to the corresponding ribs 72. When the CVT is engaged and the axially stationary sheave 70 rotates counterclockwise (as observed from the sheave's outer face), the ribs 72 are constantly coming in contact with the air around the outer face of the sheave 70. As the ribs 72 hit the air, the ribs 72 normally push the air. This contact generally slows the motion of the axially stationary sheave 70. However, with the invention, the bores 48, positioned to lead more than lag the ribs 72 in the counterclockwise rotating direction, function as a channel for the air that contacts the ribs 72. Thus, as the air contacts one of the ribs 72 with adjacent bore 48, the air travels through the bore 48 and further, through the axially stationary sheave 70. This circulated air, in turn, starts at the outer face of the axially stationary sheave 70 and ends up at an inner face of the axially stationary sheave 70. In turn, the circulated air is channeled to the area where the V-belt 44 makes contact with the inner face of the axially stationary sheave 70, and is meant to cool the V-belt 44 at the contact area 46 with the sheave 70 as well as the surrounding environment proximate to the V-belt 44.

Figure 6:
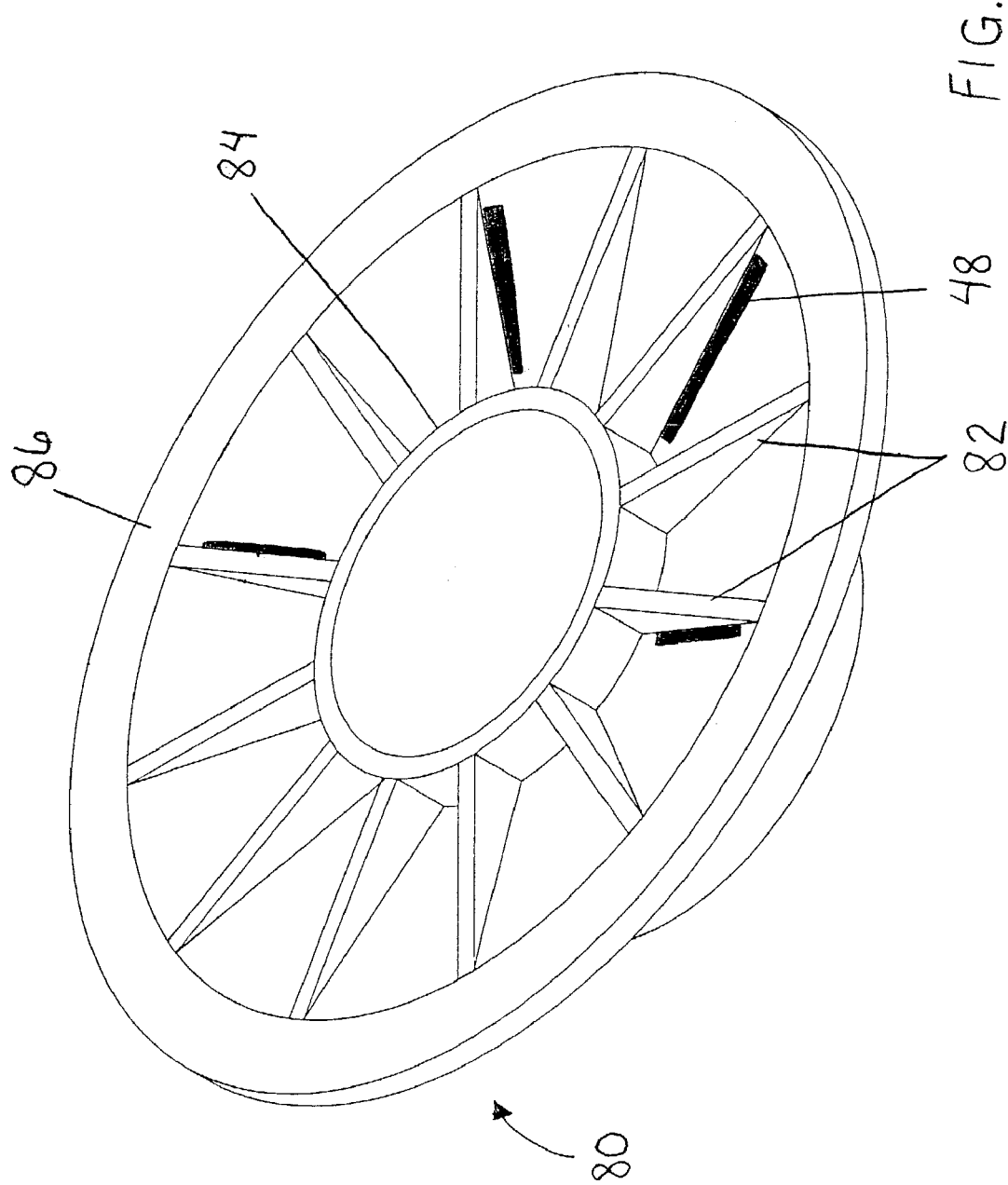
FIG. 6 is a perspective view of an axially movable sheave of the driven clutch assembly of FIG. 5.

A plurality of ribs 82 also protrude from an outer face of the axially movable sheave 80, however, these cannot be observed from the view illustrated in FIG. 5. FIG. 6 illustrates an outer face of the axially movable sheave 80 of FIG. 3. As shown, each rib 82 comprises a thin, straight-walled member that has a length dimension that exceeds its width dimension and extends from the central ring 84 to the outer edge 86 of the axially movable sheave 80. As also shown, each rib 82 is a molded portion of the axially movable sheave 80, with the lower surface of each rib 82 being integrally joined with the outer face of the sheave 80, and the upper surface of each rib 82 being exposed and ranging in height from a maximum at the end attached to the central ring 84 and generally decreasing in height as the rib 82 extends to the outer edge 86 of the sheave 80. As shown, the plurality of ribs 82 are spatially positioned around the sheave surface in a windmill-like pattern, wherein each rib 82 is generally separated from adjacently-lying ribs 82 by a substantially equal sheave surface area.

Just as with the axially stationary sheave 70 illustrated in FIG. 5, abutting every other rib 82 on the axially movable sheave 80 in FIG. 6 is at least one bore 48 (all of which cannot be observed because of the height of the ribs 82). As shown, each of the bores 48 is defined by the axially movable sheave 80 and comprised of a slot that extends through the axially movable sheave 80. The bores 48 are positioned adjacent to the corresponding ribs 82. When the CVT is engaged and the axially movable sheave 80 rotates clockwise (as observed from the sheave's outer face), the ribs 82 are constantly coming in contact with the air around the outer face of the sheave 80. As the ribs 82 hit the air, the ribs 82 normally push the air. This contact generally slows the motion of the axially movable sheave 80. However, with the invention, the bores 48, positioned to lead more than lag the ribs 82 in the clockwise rotating direction, function as a channel for the air that contacts the ribs 82. Thus, as the air contacts one of the ribs 82 with adjacent bore 48, the air generally travels through the bore 48 and further, through the axially movable sheave 80. This circulated air, in turn, starts at the outer face of the axially movable sheave 80 and ends up at an inner face of the axially movable sheave 80. In reference to FIG. 5, the circulated air is channeled to the area where the V-belt 44 makes contact with the inner face of the axially movable sheave 80, and is meant to cool the V-belt 44 at the contact area 46 with the sheave 80 as well as the surrounding environment proximate to the V-belt 44.

While in certain preferred embodiments, as described above, the plurality of ribs 72 and 82, located on the respective sheaves 70 and 80, are thin, straight-walled members, it is fully contemplated that the ribs may be of various other shapes or sizes and still be within the spirit of the invention. For example, the plurality of ribs may be shaped such that their leading side is curved outward or indented inward such that the airflow is accepted by the ribs in a differing fashion. In addition, the plurality of ribs may have a width dimension that exceeds or is equal to its length dimension. Likewise, while the plurality of ribs 72 and 82 are described as being spatially positioned about the sheaves 70 and 80 respectively such that there is an equal sheave surface area between all the adjacently located ribs, the ribs may also be spatially positioned so as to not have an equal sheave surface area between all the adjacently located ribs. While the ribs 72 and 82 are not described as such in the above-described embodiment, it is not done so as to limit the invention as such.

Figure 7:
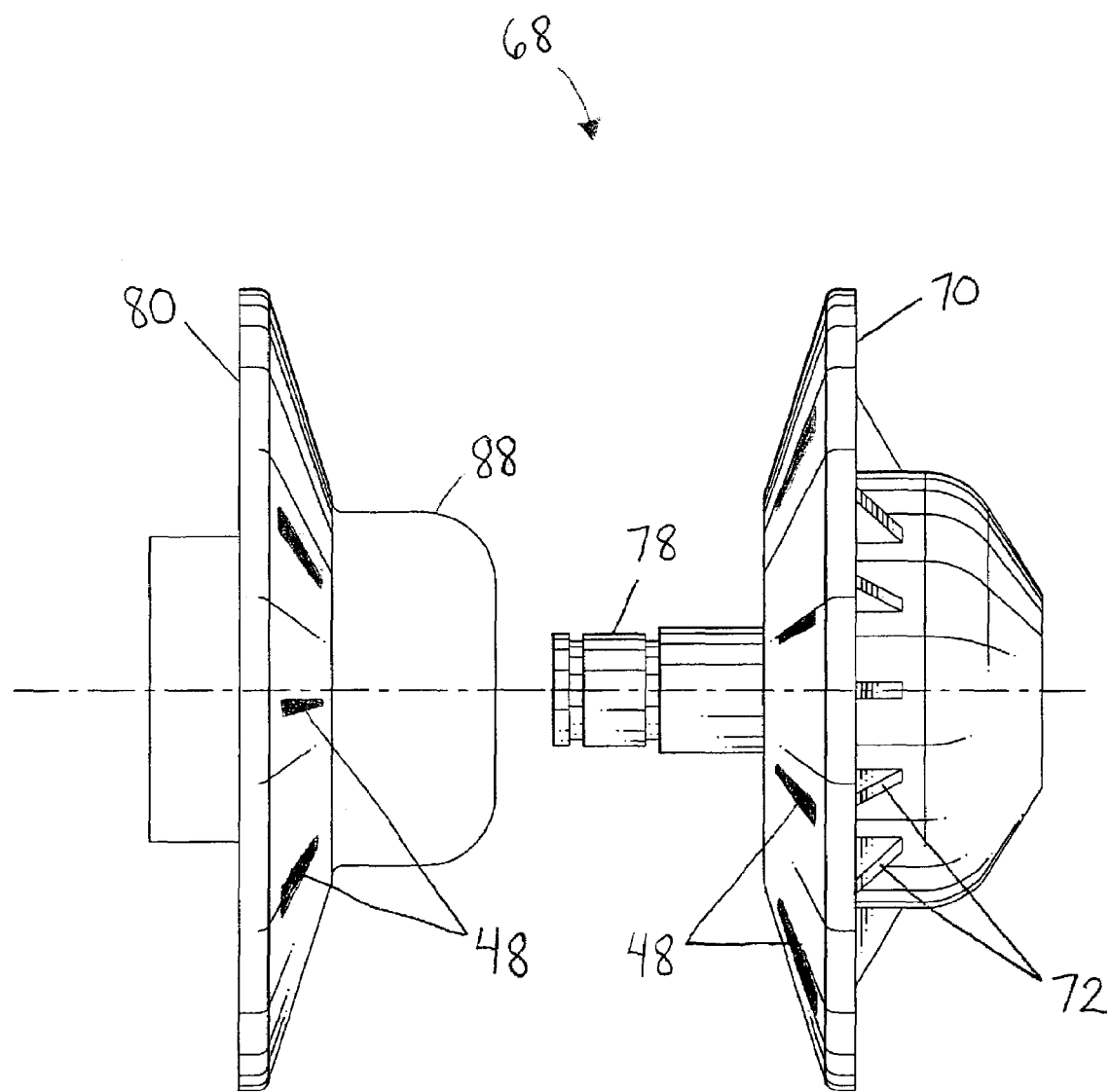
FIG. 7 is an exploded side view showing the driven clutch assembly of FIG. 5.

FIG. 7 is an exploded side view of the driven clutch assembly 68 of FIG. 5. The axially stationary sheave 70 includes an axle 78 that is centrally fixed to an inner cavity of the stationary sheave 70. The axially movable sheave 80 includes a centrally located rounded hub 88 that extends from the inner face of the movable sheave 80. The hub 88 has an opening appropriately sized to accept the axial 78, such that when the axial 78 slides into the opening of the hub 88, the axially movable sheave 80 and the axially stationary sheave 70 slide together. In turn, the combined sheaves 70 and 80 form a V-shaped "pulley" therebetween that a V-belt rides within, as illustrated in FIG. 3.

In reference to FIGS. 5 and 6, the bores 48 illustrated on the outer sides of the axially stationary sheave 70 and the axially movable sheave 80 are channeled through the respective sheaves. These same bores 48 are shown on the inner faces of both sheaves 70 and 80 in FIG. 7, with the bores 48 comprising a channel that is constant in size from inlet opening to outlet opening in the respective sheaves 70 and 80. Thus, when the axially movable sheave 80 and the axially stationary sheave 70 are combined together to form a driven clutch assembly 68 as in FIG. 5, and utilized with a drive clutch assembly and a V-belt in a CVT as in FIG. 4, air will be channeled into the driven clutch assembly 68 from the outer faces of both its corresponding sheaves 70 and 80. Subsequently, the air will be routed to the inner faces of the axially movable sheave 80 and the axially stationary sheave 70. Specifically, some of the air will be directed right into the V-belt 44, generally hitting the V-belt 44 where the V-belt 44 makes contact with the bores 48 of the axially movable sheave 80 and axially stationary sheave 70. The rest of the air that is directed through the bores 44 on the inner faces of the sheaves 70 and 80 does not contact the V-belt 44, but is directed into the environment proximate to the V-belt 44.

By routing the air in the above-described fashion, it is meant to cool the contact surfaces 46 of the V-belt 44 as well as the surrounding environment proximate to the V-belt 44. In addition, since the bores 48 allow for the air to be routed, the air should generally provide less of a slowing impact on the sheaves 70 and 80. In turn, the driven clutch assembly 68 would rotate more efficiently, and less stress would be exerted on a corresponding CVT that the clutch assembly 68 is mounted onto.

As previously discussed and illustrated in FIG. 4, as a vehicle accelerates, the rotation of the V-belt 44 is accelerated about the clutch assemblies 50 and 60. In addition, it has been mentioned that the accelerated rotation, coupled with the compressive forces exerted on the V-belt 44 by the axially movable sheave 64 and the axially stationary sheave 66 of the driven clutch assembly 60, cause a build-up of excessive heat on the surfaces 46 of the V-belt 44 that contact the sheaves. Another consequence of the accelerated rotation of the V-belt 44 is that the belt can often slip on the inner faces of the sheaves of either clutch assembly 50 or 60. This slippage generally causes a friction between the contact surfaces 46 of the V-belt 44 and the inner sheave faces of the clutches 50 and 60. This friction, in turn, generally causes a rise in temperature on the contact surfaces 46. If slippage between the V-belt 44 and the inner sheave faces of the clutches 50 and 60 occurs with enough frequency, the heat build-up on the V-belt contact surfaces 46 can lead to an overall breakdown of the V-belt 44.

This problem of V-belt 44 slippage can also be reduced with the utilization of the bores 48 in the axially movable and axially stationary sheaves 70 and 80 respectively, as illustrated in FIGS. 5 through 7. Much like a studded belt provides reduced-slip traction for a snowmobile in the snow, the bores 48 on the sheaves 70 and 80 provide for similar reduced-slip traction between the V-belt 44 and the inner faces of the sheaves 70 and 80. Specifically, as the contact surfaces 46 of the V-belt 44 come into contact with the inner faces of the sheaves 70 and 80, jagged portions (illustrated in FIGS. 4 and 5) on the inner side of the V-belt 44 are temporarily inserted inside corresponding bores 48, forming a temporary coupling between the V-belt 44 and one or both of the sheaves 70 and 80. With the temporary coupling, as the V-belt 44 is rotated about the sheaves 70 and 80, the V-belt 44 is less likely to slip across the inner surfaces of the sheaves 70 or 80 as previously described. Thus, the bores 48 provide not only a direct source for cooling the V-belt 44 by directing air into and proximate to the belt, but also an indirect source for cooling the V-belt 44 by reducing the amount of heat build-up on the belt itself in reducing slippage.

While in certain preferred embodiments, as described above, each of the bores 48 is comprised of a slotted channel that extends through the respective sheaves 70 and 80 and remains a constant size therethrough, it is fully contemplated that the bores may be of various other shapes or sizes and still be within the spirit of the invention. For example, each bore 48 may comprise a circular or rectangular shaped channel and function just as well. In addition, each bore 48 may vary in size from inlet opening to outlet opening such that the inlet is wider than the outlet, or the inlet is narrower than the outlet. Further, each bore 48 on any one sheave may be comprised of all similarly sized channels as described above, or in contrast, may be comprised of a plurality of differently sized channels. In addition, the number of bores 48 per sheave may vary. While it is described that there is at least one bore for every other rib on the disclosed sheaves, it is also contemplated having at least one bore for every rib on the sheave as well as having at least one bore for a lesser number of ribs on the sheave, including a contemplated embodiment of having at least one rib for only one rib on the sheave. While each bore 48 may not be described as such in the above-described embodiment, it is not done so as to limit the invention as such.

While a preferred embodiment of the present invention has been described, it should be understood that various changes, adaptations, and modifications may be made therein without departing from the spirit of the invention and the scope of the appended claims.

What is claimed is:

1. A clutch assembly comprising:
    an axially stationary sheave and an axially movable sheave, each sheave having a sheave body with an inner face and an outer face, the inner faces of the sheaves being oppositely disposed from each other, forming a pulley;
    a plurality of ribs protruding from the outer face of at least one of the axially stationary sheave or the axially movable sheave, the plurality of ribs being spatially distributed over the outer face of the at least one sheave; and
    at least one bore abutting a side of one or more ribs of the plurality of ribs, the at least one bore positioned to lead the one or more ribs in the rotating direction of the at least one sheave, the at least one bore extending entirely through the at least one sheave, and the at least one bore positioned so air striking the side of the one or more ribs enters the at least one bore when the at least one of the axially stationary sheave or the axially movable sheave is rotated.

2. The clutch assembly of claim 1, wherein the plurality of ribs extend from a central portion of the sheave to an outer edge of the at least one sheave.

3. The clutch assembly of claim 1, wherein the plurality of ribs have a width dimension that is less than their length dimension.

4. The clutch assembly of claim 1, wherein the leading side of the plurality of ribs is of a shape configured to guide air that contacts the rib as the at least one sheave is rotated.

5. The clutch assembly of claim 4, wherein the leading side of the plurality of ribs comprises a straight surface.

6. The clutch assembly of claim 1, wherein the at least one bore is aligned with the side of the one or more ribs.

7. The clutch assembly of claim 1, wherein the plurality of ribs is spatially distributed over the at least one sheave.

8. The clutch assembly of claim 7, wherein there is a substantially equal sheave surface area between all adjacent ribs.

9. The clutch assembly of claim 1, wherein the at least one bore is located and shaped so that the sheave is dynamically balanced about a rotational axis thereof.

10. The clutch assembly of claim 1, wherein the at least one bore comprises a channel that is constant in size from inlet opening to outlet opening.

11. The clutch assembly of claim 1, wherein the at least one bore comprises a plurality of substantially similarly shaped channels.

12. The clutch assembly of claim 1, wherein the at least one bore comprises a slot.

13. The clutch assembly of claim 1, wherein the clutch assembly is a driven clutch assembly.

14. The clutch assembly of claim 1, wherein the clutch assembly is a torque-responsive clutch assembly.

15. The clutch assembly of claim 1, wherein the clutch assembly is a centrifugal clutch assembly.

16. The clutch assembly of claim 1, wherein the clutch assembly is a drive clutch assembly.

17. The clutch assembly of claim 1, wherein the at least one bore extends from the outer face of the at least one sheave to an inner face of the at least one sheave.

18. The clutch assembly of claim 1, where the at least one bore is located axially underneath the one or more ribs.

19. The clutch assembly of claim 1, wherein the at least one bore is positioned to lead more than lag the one or more ribs.

20. A method of providing radially- and laterally-directed airflow to a V-belt utilized in a continuously variable transmission, comprising the steps of:
    providing a continuously variable transmission;
    removing a clutch assembly from the continuously variable transmission;

removing a first sheave from the clutch assembly;
providing a second sheave, the second sheave comprising an inner face and an outer face, the outer face having a plurality of spatially distributed ribs, at least one bore positioned to lead at least one of the ribs in the rotating direction of the second sheave, the at least one bore extending entirely through the at least one sheave, and the at least one bore positioned so air striking the side of the one or more ribs enters the at least one bore when the at least one of the axially stationary sheave or the axially movable sheave is rotated;
replacing the first sheave with the second sheave on the clutch assembly; and
replacing the clutch assembly in the continuously variable transmission.

21. The method of claim 20, wherein the at least one bore is adapted to channel air from the outer face of the at least one sheave to the inner face of the second sheave.

22. The method of claim 20, where the at least one bore is positioned axially underneath the one or more ribs.

23. The method of claim 20, further comprising the step of disposing an endless belt about the clutch assembly, and wherein when the clutch assembly having the second sheave thereon is operated, at least one portion of the endless belt contacting the second sheave is temporarily inserted in the at least one bore, providing a temporary coupling between the endless belt and the second sheave.

24. The method of claim 20, wherein the at least one bore is extended from the outer face of the second sheave to the inner face of the second sheave.

25. The method of claim 20, wherein the at least one bore is extended across the inner face of the second sheave, and wherein the bore extends from a central portion of the second sheave to an outer portion of the second sheave.

* * * * *